E. E. GAMON.
WATER METER.
APPLICATION FILED MAY 18, 1909.
992,954.
Patented May 23, 1911.
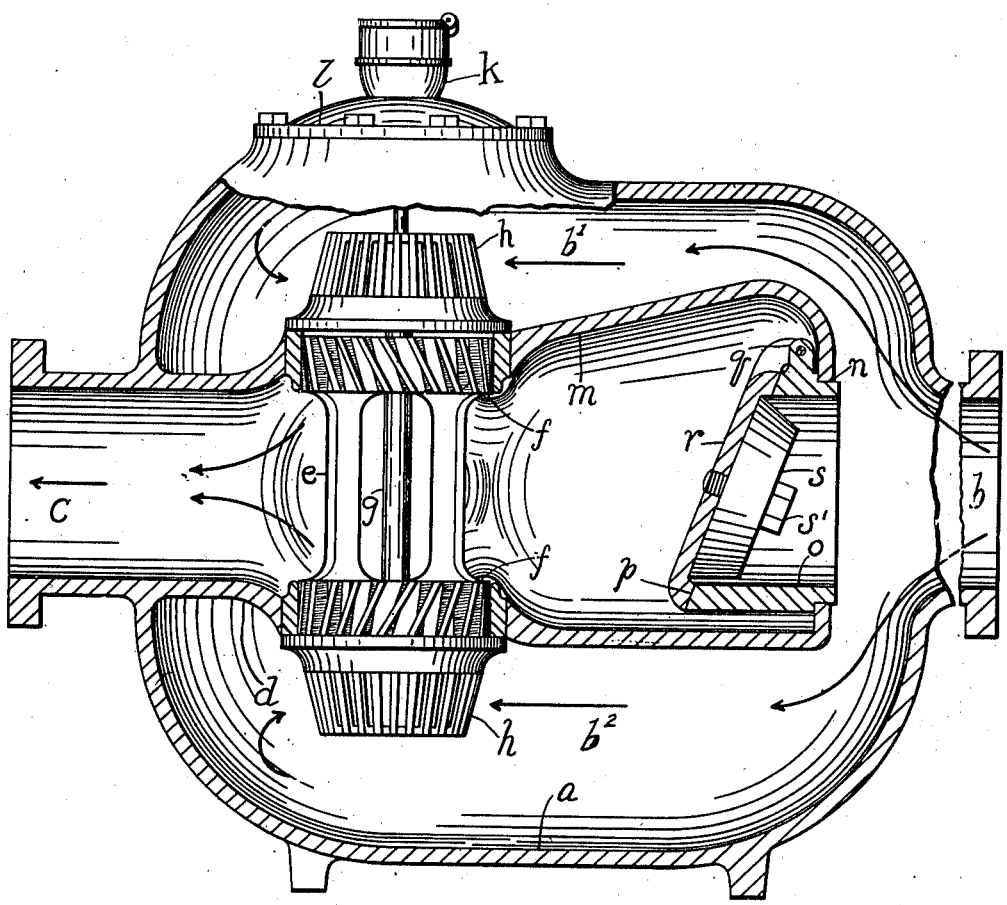
WITNESSES:
Chas. P. Day.
C. A. Alliston.
INVENTOR:
Ernest E. Gamon
BY
Fischer & Sanders.
ATTORNEYS.

UNITED STATES PATENT OFFICE.

ERNEST E. GAMON, OF NEWARK, NEW JERSEY.

WATER-METER.

992,954.  Specification of Letters Patent.  Patented May 23, 1911.

Application filed May 18, 1909. Serial No. 496,851.

*To all whom it may concern:*

Be it known that I, ERNEST E. GAMON, a citizen of the United States, residing in the city of Newark, county of Essex, and State of New Jersey, have invented certain new and useful Improvements in Water-Meters, of which the following is a full, clear, and exact description, such as will enable others skilled in the art to which it pertains to make and use the same.

My invention relates particularly to service water meters or meters of large capacity, in which the water passing therethrough is measured inferentially by means of propeller wheels having blades spirally arranged about the periphery, the revolutions of the propellers being registered in terms of rate of flow by any suitable registering mechanism. Meters of this type are installed for plants using large quantities of water, and it is the custom to make no charge for water used in case of fire; fortunately with this type of meter, the percentage of registration falls off very much when the normal capacity of the meter is exceeded which would occur when the full capacity of the main is drawn upon as would be done in case of fire.

The object of my invention is to provide means whereby when the normal capacity of the meter is exceeded as above mentioned in case of fire, the water will flow directly through the channels around and between the propellers to the outlet spud without being registered and with less resistance than would otherwise be the case.

A simple method of constructing my invention is illustrated in the accompanying drawing, which represents a vertical longitudinal section of my improved meter.

Similar letters of reference refer to like parts throughout the specification and drawings.

The meter case $a$ has the usual inlet spud $b$, and outlet spud $c$. The inflowing stream from the inlet $b$ is caused to divide and pass up and down to the receiving chambers $b'$ and $b^2$ of the main or external case $a$ as indicated by the arrows. The outlet spud $c$ is connected to the annular channel $d$ which supports the open frame $e$; the latter inclosing the two propellers $f$. The propellers $f$ are both fixed to the shaft $g$ which by suitable connections drives a register gear train in the usual manner, the register being inclosed in the housing $k$ secured to the lid $l$.

The strainers $h$ above and below the annular channel $d$ contain the bearings for the propeller shaft $g$.

The construction so far described is usual in meters of this type as at present manufactured.

My improvement consists of the supplemental chamber $m$ projecting from the annular channel $d$ toward the inlet spud $b$. The wall of the supplemental chamber $m$ toward the inlet spud $b$ is bored out at $n$ to receive the tubular bushing $o$ which has its inner end ground or planed off at an angle to form the valve seat $p$. At the upper edge of the valve seat is a hinge lug $q$ integral with the tubular bushing $o$ to which is hinged the weighted valve $r$; the weight being shown as a disk $s$ bolted to the valve $r$ by the bolt $s'$. By this arrangement, the weight of the valve may be varied.

The operation of the meter with my improvement will be as usual under normal conditions; that is, the water will flow as indicated by the arrows, from the inlet spud $b$ through the channels above and below the annular channel $d$ through the strainers $h$, then down through and between the propellers to the outlet spud $c$, the rotation of the propellers being registered in the usual way. When an abnormal supply of water is drawn through the meter, the difference in pressure between the inlet spud $b$ and outlet spud $c$ will be great enough to lift the valve $r$ and thereby eliminate the meter, as it were, and provides a straight channel of the full capacity of the main which will permit the rapid delivery of a large quantity of water directly through the annular channel $d$ and between the propellers $f$ to the outlet spud $c$ without being registered.

It will be understood that other arrangements of the valve may be devised to produce the desired result, therefore, my claims are not limited to the specific mechanism here shown.

I claim:

1. In a water meter, the combination with a main casing having inlet and outlet spuds, upper and lower receiving chambers and an intermediate supplemental chamber, propeller wheels mounted in said supplemental chamber for measuring the flow of water therethrough under normal conditions and automatic means inserted in said supplemental chamber for permitting direct communication between said spuds and supplemental chamber under abnormal conditions when the difference in pressure between said spuds reaches a certain predetermined point.

2. In a water meter, the combination with a main casing having inlet and outlet spuds, upper and lower receiving chambers and an intermediate supplemental chamber, propeller wheels mounted in said supplemental chamber for measuring the flow of water therethrough under normal conditions, and a valve inserted in said supplemental chamber operating automatically for permitting direct communication between said spuds and supplemental chamber under abnormal conditions when the difference in pressure between said spuds reaches a certain predetermined point.

3. In a water meter, the combination with a main casing having inlet and outlet spuds, upper and lower receiving chambers and an intermediate supplemental chamber, propeller wheels mounted in said supplemental chamber for measuring the flow of water therethrough under normal conditions, a weighted valve in said supplemental chamber, said valve operating for permitting direct communication between said spuds and supplemental chamber under abnormal conditions when the difference in pressure between said spuds reaches a certain predetermined point.

4. In a water meter, the combination with a main casing having inlet and outlet spuds, upper and lower receiving chambers and an intermediate supplemental chamber, propeller wheels mounted in said supplemental chamber for measuring the flow of water therethrough under normal conditions, the supplemental chamber provided with an opening in line with said inlet spud, and a valve for normally closing said opening, the said valve being so adjusted that it will open automatically for permitting direct communication between the inlet and outlet spud and supplemental chamber when the difference in pressure between said spuds reaches a certain predetermined point.

5. In a water meter, the combination with a main casing having inlet and outlet spuds, upper and lower receiving chambers and an intermediate supplemental chamber, a cylinder mounted in said supplemental chamber provided with openings communicating with said outlet spud, propeller wheels mounted in said cylinder for measuring the flow of water therethrough under normal conditions, and automatic means inserted in said supplemental chamber for permitting direct communication between said spuds and supplemental chamber under abnormal conditions when the difference in pressure between said spuds reaches a certain predetermined point.

This specification signed and witnessed this 10th day of May 1909.

ERNEST E. GAMON.

Witnesses:
   FREDK. C. FISCHER,
   C. A. ALLISTON.